US008783517B2

(12) United States Patent
Malik et al.

(10) Patent No.: US 8,783,517 B2
(45) Date of Patent: *Jul. 22, 2014

(54) FOAM DISPENSER NOZZLE (75) Inventors: Moshe Malik, Carmiel (IL); Shalom Levin, Atlit (IL); Shlomo Nevo, Tel-Aviv (IL)

(73) Assignee: P G United States Israel Ltd., Tel-Aviv (IL)

(*) Notice: Subject to any disclaimer, the term of this patent is extended or adjusted under 35 U.S.C. 154(b) by 251 days.

This patent is subject to a terminal disclaimer.

(21) Appl. No.: 13/042,480

(22) Filed: Mar. 8, 2011

(65) Prior Publication Data

US 2011/0155762 A1 Jun. 30, 2011

Related U.S. Application Data (63) Continuation of application No. 10/599,385, filed as application No. PCT/IL2005/000355 on Mar. 29, 2005.

(60) Provisional application No. 60/556,883, filed on Mar. 29, 2004.

(51) Int. Cl.
| *B05B 7/04* | (2006.01) |
| *B05B 9/047* | (2006.01) |
| *B05B 11/02* | (2006.01) |
| *B01F 15/02* | (2006.01) |
| *B01F 15/00* | (2006.01) |

(52) U.S. Cl.
USPC ........ 222/145.5; 222/214; 222/333; 222/390; 239/304; 239/324; 239/329; 239/398; 366/177.1; 366/181.6

(58) Field of Classification Search
USPC ............. 222/94, 101, 108, 137, 145.5, 145.6, 222/214, 333, 390, 575; 239/303, 304, 329, 239/398, 407, 412–415; 604/82, 89, 104; 366/177.1, 181.6, 181.8, 182.1, 182.4
See application file for complete search history.

(56) References Cited

U.S. PATENT DOCUMENTS

| 3,178,157 A | 4/1965 | Cole, III |
| 3,232,585 A | 2/1966 | Garbarino, Jr. et al. |
| 3,302,832 A | 2/1967 | Hardman et al. |

(Continued)

FOREIGN PATENT DOCUMENTS

| DE | 20307518 | 8/2003 |
| FR | 2416718 | 9/1979 |

(Continued)

OTHER PUBLICATIONS

Response Dated Aug. 16, 2011 to Official Action of Mar. 29, 2011 From the US Patent and Trademark Office Re.: U.S. Appl. No. 10/599,376.

(Continued)

*Primary Examiner* — Darren W Gorman (57) ABSTRACT

A chemical mixing device. The device includes a flow generator operative to provide at least two streams of chemicals and a mixing chamber, including at least two inlets adapted to receive the at least two streams of chemicals and an outlet through which a mixture of the streams of chemicals is ejected from the mixing device. The mixing chamber has an open state in which the chemicals are mixed and a closed state in which the volume of the mixing chamber is less than a fifth of the open state volume.

25 Claims, 6 Drawing Sheets

(56) References Cited

U.S. PATENT DOCUMENTS

| | | |
|---|---|---|
| 3,397,694 A | 8/1968 | Ogle et al. |
| 3,451,347 A | 6/1969 | Kihachi |
| 3,896,973 A | 7/1975 | Morgan |
| 4,019,652 A | 4/1977 | Suh et al. |
| 4,154,368 A | 5/1979 | Gusmer et al. |
| 4,262,847 A | 4/1981 | Stitzer et al. |
| 4,269,890 A | 5/1981 | Breitling et al. |
| 4,273,260 A | 6/1981 | Bush |
| 4,440,320 A | 4/1984 | Wernicke |
| 4,568,003 A | 2/1986 | Sperry et al. |
| 4,790,454 A | 12/1988 | Clark et al. |
| 4,826,048 A | 5/1989 | Skorka et al. |
| 4,854,482 A | 8/1989 | Bergner |
| 4,913,317 A | 4/1990 | Wernicke |
| 4,952,068 A | 8/1990 | Flint |
| 4,974,752 A | 12/1990 | Sirek |
| 5,102,228 A | 4/1992 | Vine-Lott |
| 5,169,029 A | 12/1992 | Behar et al. |
| 5,242,115 A | 9/1993 | Brown |
| 5,265,761 A | 11/1993 | Brown |
| 5,348,392 A | 9/1994 | Bouquet et al. |
| 5,381,962 A | 1/1995 | Teague |
| 5,388,761 A | 2/1995 | Langeman |
| 5,405,083 A | 4/1995 | Moses |
| 5,429,308 A | 7/1995 | Brown |
| 5,450,988 A | 9/1995 | Jerdee |
| 5,462,204 A | 10/1995 | Finn |
| 5,526,957 A | 6/1996 | Brown et al. |
| 5,647,510 A | 7/1997 | Keller |
| 5,755,269 A | 5/1998 | Venooker et al. |
| 5,762,239 A | 6/1998 | Cossette |
| 5,779,103 A | 7/1998 | Massena |
| 5,924,599 A | 7/1999 | Brown |
| 5,938,079 A | 8/1999 | Wacker et al. |
| 5,979,787 A | 11/1999 | Scarpa |
| 5,981,909 A | 11/1999 | Freeman |
| 5,990,456 A | 11/1999 | Kilbride |
| 6,041,972 A | 3/2000 | Maayeh et al. |
| 6,076,750 A | 6/2000 | Mykkänen et al. |
| 6,079,868 A | 6/2000 | Rydell |
| 6,089,407 A | 7/2000 | Gardos |
| 6,123,235 A | 9/2000 | Hsu |
| 6,131,375 A | 10/2000 | Sperry |
| 6,131,770 A | 10/2000 | Allen |
| 6,216,915 B1 | 4/2001 | Harman et al. |
| 6,289,649 B1 | 9/2001 | Cherfane |
| 6,375,096 B1 | 4/2002 | Rashidi |
| 6,383,572 B1 | 5/2002 | De Graaf et al. |
| 6,444,713 B1 | 9/2002 | Pachl et al. |
| 6,479,560 B2 | 11/2002 | Freitag et al. |
| 6,533,189 B2 | 3/2003 | Kott et al. |
| 6,554,207 B2 | 4/2003 | Ebberts |
| 6,558,059 B1 | 5/2003 | Hillinger et al. |
| 6,691,898 B2 | 2/2004 | Hurray et al. |
| 6,900,416 B1 | 5/2005 | Erik |
| 7,060,049 B2 | 6/2006 | Trombley, III et al. |
| 2004/0084552 A1 | 5/2004 | Huartson |
| 2005/0017025 A1 | 1/2005 | Niada |
| 2008/0035673 A1 | 2/2008 | Malik et al. |
| 2008/0272148 A1 | 11/2008 | Malik et al. |

FOREIGN PATENT DOCUMENTS

| | | |
|---|---|---|
| WO | WO 01/64325 | 9/2001 |
| WO | WO 2005/091720 | 10/2005 |
| WO | WO 2005/091721 | 10/2005 |
| WO | WO 2005/091720 | 1/2007 |

OTHER PUBLICATIONS

Official Action Dated Mar. 15, 2012 From the US Patent and Trademark Office Re.: U.S. Appl. No. 10/599,385.
Official Action Dated Nov. 1, 2011 From the US Patent and Trademark Office Re.: U.S. Appl. No. 10/599,376.
Official Action Dated Mar. 28, 2011 From the US Patent and Trademark Office Re.: U.S. Appl. No. 10/599,376.
Official Action Dated Dec. 18, 2012 From the US Patent and Trademark Office Re. U.S. Appl. No. 10/599,376.
Communication Pursuant to Article 94(3) Dated Jul. 14, 2010 From the European Patent Office Re.: Application No. 05718928.4.
Communication Pursuant to Article 94(3) Dated Nov. 23, 2009 From the European Patent Office Re.: Application No. 05718928.4.
International Preliminary Report on Patentability Dated Oct. 4, 2006 From the International Bureau of WIPO Re.: Application No. PCT/IL2005/000356.
International Preliminary Report on Patentability Dated Dec. 11, 2008 From the International Bureau of WIPO Re.: Application No. PCT/IL2005/000355.
International Search Report and the Written Opinion Dated Jun. 12, 2008 From the International Searching Authority Re.: Application No. PCT/IL05/00355.
International Search Report Dated Oct. 31, 2005 From the International Searching Authority Re.: Application No. PCT/IL2005/000356.
Official Action Dated Mar. 10, 2010 From the US Patent and Trademark Office Re.: U.S. Appl. No. 10/599,376.
Official Action Dated Jan. 19, 2010 From the US Patent and Trademark Office Re.: U.S. Appl. No. 10/599,385.
Official Action Dated Aug. 20, 2010 From the US Patent and Trademark Office Re.: U.S. Appl. No. 10/599,385.
Response Dated Jul. 12, 2010 to Official Action of Mar. 10, 2010 From the US Patent and Trademark Office Re.: U.S. Appl. No. 10/599,376.
Response Dated May 18, 2010 to Official Action of Jan. 19, 2010 From the US Patent and Trademark Office Re.: U.S. Appl. No. 10/599,385.
Response Dated Dec. 19, 2010 to Communication Pursuant to Article 94(3) of Jul. 14, 2010 From the European Patent Office Re.: Application No. 05718928.4.
Response Dated Nov. 22, 2010 to Official Action of Aug. 20, 2010 From the US Patent and Trademark Office Re.: U.S. Appl. No. 10/599,385.
Response Dated May 24, 2010 to Communication Pursuant to Article 94(3) of Nov. 23, 2009 From the European Patent Office Re.: Application No. 05718928.4.
Supplementary European Search Report Dated May 14, 2009 From the European Patent Office Re.: Application No. 05718928.4.
Written Opinion Dated Oct. 31, 2005 From the International Searching Authority Re.: Application No. PCT/IL2005/000356.
IPI "Navigation", Inflatable Packaging Incorporated (IPI), Product Description, 1 P., 2003.

FOAM DISPENSER NOZZLE

RELATED APPLICATIONS

This application is a continuation of U.S. patent application Ser. No. 10/599,385 filed Aug. 9, 2007, which is a National Phase of PCT Patent Application No. PCT/IL2005/000355 having International Filing Date of Mar. 29, 2005, which claims the benefit of priority under 35 USC 119(e) of U.S. Provisional Patent Application No. 60/556,883 filed Mar. 29, 2004. The contents of the above application which are incorporated herein by reference in their entirety.

FIELD OF THE INVENTION

The present invention relates to foam dispensers and particularly to hand held foam dispensers.

BACKGROUND OF THE INVENTION

Foam materials are commonly used for packaging. The foam is generally generated by mixing two chemical components, which expand and harden within about 10-30 seconds. In many cases, a foam dispensing gun is used to generate the foam at the packaging site. The foam is generally mixed within the dispensing gun and is ejected from the gun into a bag or a package before the foam hardens.

U.S. Pat. No. 3,178,157 to Cole, U.S. Pat. No. 6,691,898 to Hurray et al., and U.S. Pat. No. 5,462,204 to Finn, the disclosures of which are incorporated herein by reference, describe such dispensing guns used in forming the foam.

As foam materials harden within a short time, remnants of the foam may harden within the dispensing apparatus and clog flow passageways.

One solution to the clogging of passages is to include a solvent flushing path in the gun, which provides a solvent that cleans out portions of the gun that require cleaning, after every use. U.S. Pat. No. 4,262,847 to Stitzer et al., the disclosure of which is incorporated herein by reference, describes one such gun. Other dispensing guns include a mechanical cleaning device that passes through the mixing chamber between uses.

U.S. Pat. No. 5,405,083 to Moses, the disclosure of which is incorporated herein by reference, describes another dispensing gun in which a disposable mixing tube is replaced, each time the gun is used.

U.S. Pat. No. 5,429,308 to Brown, the disclosure of which is incorporated herein by reference, describes a mixing gun having a replaceable nozzle including a mixing chamber. Those parts of the gun that come in contact with the mixed chemicals are included in the replaceable nozzle. In the non-disposable part of the gun, respective valves are used to control the flow of each of the chemical components into the mixing chamber.

U.S. Pat. No. 6,375,096 to Rashidi, the disclosure of which is incorporated herein by reference, describes a foam gun with a disposable nozzle attachment including a mixing chamber in which the chemicals mix. The disposable nozzle includes one way valves for each of the chemicals entering the nozzle attachment, so as to prevent backflow of the chemicals into the non-disposable part of the gun.

The cost of the disposable nozzle attachments is not negligible and their replacement is time consuming. It is therefore desired to reduce and even eliminate the need for replacement of the disposable nozzle attachments, without incurring the costs and inconvenience involved in a solvent flushing system or a mechanical cleaning system.

U.S. Pat. No. 4,262,848 to Chabria, the disclosure of which is incorporated herein by reference, describes a dispensing gun, which does not have a mixing chamber at all. The chemicals are mixed a short distance distal from the dispensing gun. Such mixing in the air, may result in a reduced quality of the foam. A flexible extension is suggested to be used to separately lead the chemicals before they are mixed to a location forward of the gun.

SUMMARY OF THE INVENTION

An aspect of some embodiments of the invention relates to a dispensing gun having a mixing chamber, which has a closed state in which the mixing chamber has a substantially zero volume and an open state in which the chamber serves for mixing two or more chemicals.

In some embodiments of the invention, the mixing chamber is biased in the closed state. When an external pressure is applied to the chamber, for example by the pressure of the chemicals pumped into the mixing chamber, the mixing chamber is moved to the open state and the chemicals are mixed therein. Thus, substantial amounts of foam cannot settle in the mixing chamber and cannot clog the mixing chamber.

In other embodiments of the invention, the mixing chamber is normally in the open state. When a usage session of the dispensing gun is completed, the mixing chamber is moved into the closed state, for example by pressing bars and/or rollers which compress the mixing chamber and remove any foam from the chamber. Since at this point the foam is not yet hardened, it is easily removed from the chamber. After removal of the residual foam, the chamber is expanded into its normally open state. Optionally, the mixing chamber is compressed for a short period, for example less than 5 seconds, 2 seconds or even less than a second, such that if any remnants do remain and harden, they do not stick the mixing chamber in the closed state. Alternatively, the compression is performed for a relatively long period, for example more than 20 seconds, more than 2 minutes or even more than 10 minutes.

In still other embodiments of the invention, the mixing chamber does not have an inherent preferred state. When the dispensing gun is used, the chemicals pushed into the mixing chamber move the mixing chamber to the open state. When the current operation of the dispensing gun is completed, an external pressure pushes the mixing chamber into the closed state, and the mixing chamber remains in the closed state until the dispensing gun is used again.

Optionally, the mixing chamber is defined by a nozzle formed of a compressible material. The mixing chamber is optionally pressed into a closed state by an external force, for example by an external rigid housing or elastic ring. Chemical streams to be mixed in the mixing chamber compress the walls of the mixing chamber to expand the mixing chamber. Alternatively, the mixing chamber is formed of a flexible material, not necessarily compressible. In some embodiments of the invention, the mixing chamber is biased in a closed state, but is pushed open under the force of the chemical streams. In some embodiments of the invention, the mixing chamber is held in the closed state by a force substantially greater than required in order to press the walls of the mixing chamber against each other, absent external force, so as to push out of the mixing chambers, any remnant chemicals which may remain therein.

An aspect of some embodiments of the invention relates to a dispensing gun having a small mixing chamber. On one hand, the use of a small mixing chamber may limit the life span of a nozzle including the mixing chamber and/or may reduce the quality of the mixture. It is noted, however, that the use of a mixing chamber, even if very small, is believed to provide a sufficiently high mixture quality, especially compared to performing the mixing in the air.

On the other hand, the use of a small mixing chamber limits the amount of foam that can settle in the mixing chamber, such that settling foam in the mixing chamber is removed relatively easily. In some embodiments of the invention, the mixing chamber is small enough, such that the pressure of the chemicals excreted by the dispensing gun in the next usage is sufficient to clear foam remnants filling the mixing chamber.

In some embodiments of the invention, the small mixing chamber has a volume of less than 100 cubic millimeters, or even less than 20 cubic millimeters. Optionally, the mixing chamber has a volume of less than 10 cubic millimeters, 5 cubic millimeters or even 3 cubic millimeters. Alternatively or additionally, the small mixing chamber has a length, from the point of mixing of the chemicals to the point at which the mixture leaves the gun into the atmosphere, of less than a centimeter or even less than 5 millimeters. In an exemplary embodiment of the invention, the length from the mixing point to the exit point is not longer than 3 millimeters. The sizes mentioned herein refer to the mixing chamber from the point where the chemicals touch each other, to the point at which the mixture leaves the dispensing gun to the atmosphere.

Optionally, the cross-section area of the mixing chamber is less than 20 square millimeters, less than 10 square millimeters or even less than 3 square millimeters.

An aspect of some embodiments of the invention relates to a dispensing gun having narrowing channels that lead the chemicals to the mixing chamber. The use of narrowing channels increases the velocity of the streams entering the mixing chamber and/or increases the pressure of the streams, for example in order to open a pressure valve on the path of the stream to the mixing chamber.

In some embodiments of the invention, the cross section of the channels decreases by at least a factor of two, three or even five, from the entrance to the channel to the mixing chamber. In an exemplary embodiment of the invention, the cross section of the channels decreases from about 10 square millimeters to about 2 square millimeters.

Optionally, the cross-section of the channels leading the chemicals to the mixing chamber is less than 5 square millimeters or even less than 2 square millimeters at the entrance to the mixing chamber.

In some embodiments of the invention, the channels have a monotonically non-increasing cross section over their entire length. Alternatively, the channels have a monotonically non-increasing cross section at least over last stretches, of at least 3, 5 or even 10 millimeters of the channels closest to the mixing chamber.

An aspect of some embodiments of the invention relates to a dispensing gun having an elastic nozzle including a mixing chamber, in which at least two components are mixed and from which the mixture is expelled to the atmosphere. Using a nozzle from an elastic material allows compressing the mixing chamber within the nozzle to substantially zero volume, after use, so as to prevent settling of foam remnants in the mixing chamber. In addition, the use of an elastic nozzle allows applying pressure to a portion of the nozzle, such that the pressured portion of the nozzle serves as a pressure-response valve. This pressure-response valve prevents the remaining mixture of chemicals from backing up into other parts of the dispensing gun, when the flow of the chemicals is stopped and the remaining chemicals expand. Furthermore, use of an elastic nozzle simplifies, in some cases, the cleaning of the nozzle from foam remnants. It is noted that multiple use nozzles of the prior art are generally rigid, in order to withstand the high pressures and forces involved in the mixing process and/or the cleaning of the mixing chamber of the nozzle between uses.

In some embodiments of the invention, a separate, optionally rigid, member is used to apply pressure to the elastic nozzle and prevent back flow of the mixture from the mixing chamber.

The use of an elastic nozzle also allows compressing the nozzle by a human user of the gun to remove foam remnants. The elastic nozzle is optionally sufficiently durable to be usable after compression.

The nozzle is optionally formed of a smooth material to which the mixture does not stick. For example, if the mixture comprises polyurethane, the nozzle optionally comprises silicon, Teflon and/or similar materials.

An aspect of some embodiments of the invention relates to a dispensing gun which allows entrance of chemicals into a mixing chamber only when the chemicals apply at least a pressure of 2 bar. In some embodiments of the invention, higher pressures are required, such as at least 3, 4 or even 5 bar. Optionally, a pressure response valve applying a closing pressure, prevents the entrance of the chemicals if the required chemical pressure is not applied. The closing pressure of the valve prevents back flow of the mixture into other parts of the dispensing gun and hence the clogging of the gun by foam remnants. It is noted that a valve that opens even to low pressure levels is not sufficient to entirely prevent the backflow, since chemical and/or mixture remnants may be located within the valve when the chemical flow is stopped.

An aspect of some embodiments of the invention relates to a foam dispensing device having a flared mixing chamber with a larger opening to the environment than to the sources of the mixed chemicals. In some embodiments of the invention, the opening to the environment is larger than 10% or even 30% of the outer surface of the chamber. Optionally, the chamber has a conic shape, receiving the foam through a narrow end of the cone and having an opening to the environment at the wide end of the chamber. The use of a mixing chamber having a large opening to the environment allows relatively easy removal of foam remnants that hardened in the mixing chamber.

The foam dispensing device may be a self contained device with chemical containers mounted thereon, or may be a device which receives chemicals from remote containers, via tubes.

The nozzle is optionally detachable from the remaining portions of the dispensing gun, such that the portions of the gun that come in contact with the foam are easily replaceable. It is noted, however, that implementation of at least some of the above described aspects of the present invention allow reuse of the gun with the same nozzle for over 10, 40 or even 100 separate foam generation sessions.

An aspect of some embodiments of the invention relates to a dispensing gun having a mixing chamber for multiple use, which does not include an apparatus (e.g., mechanical or chemical) for cleaning the interior of the mixing chamber. Such cleaning apparatus for the interior of the chamber, not included in the dispensing gun, may be a mechanical rod passed through the chamber or tubing for injecting a solvent into the mixing chamber. Such apparatus for cleaning the mixing chamber is generally expensive, so that doing without them reduces the cost of the dispensing gun.

In some embodiments of the invention, the only openings of the mixing chamber are the inlets through which the chemicals enter the mixing chamber and the outlets through which the mixture is ejected.

An aspect of some embodiments of the invention relates to a replacement part kit for a dispensing gun, which includes both a flow generator (e.g., a chemical pump or suction unit) and a nozzle. Optionally, the flow generator and nozzle are attached within the kit. In some embodiments of the invention, the flow generator and mixing chamber are not adapted for separation without usage of tools.

There is therefore provided in accordance with an exemplary embodiment of the invention, a chemical mixing device, comprising a flow generator operative to provide at least two streams of chemicals and a mixing chamber, including at least two inlets adapted to receive the at least two streams of chemicals and an outlet through which a mixture of the streams of chemicals is ejected from the mixing device, the mixing chamber has an open state in which the chemicals are mixed and a closed state in which the volume of the mixing chamber is less than a fifth of the open state volume.

Optionally, the mixing chamber has a substantially zero volume in the closed state. Optionally, the mixing chamber has walls that are biased in a closed state in which the walls are pressed against each other. Optionally, the walls of the mixing chamber are biased in the closed state by a pressure greater than required to keep the mixing chamber in the closed state.

Optionally, the mixing chamber has a volume smaller than a cubic millimeter in the closed state. Optionally, the mixing chamber has a volume of less than 20 cubic millimeters in the open state. Optionally, the mixing chamber remains in the closed state when the flow generator does not operate. Optionally, the pressure of the streams of chemicals move the mixing chamber into the open state. Optionally, the mixing chamber comprises a flexible material. Optionally, the mixing chamber comprises a compressible material.

Optionally, the mixing chamber material has a hardness of less than 60 shore A.

Optionally, the device includes a rigid structure which continuously applies a closing force to the mixing chamber. Optionally, the device includes an elastic ring which continuously applies a closing force to the mixing chamber. Optionally, the device includes a pressure unit which controllably applies a closing pressure on the mixing chamber, when the mixing chamber is in the closed state, but does not apply the closing pressure when the mixing chamber is to be in the open state. Optionally, the flow generator and a nozzle containing the mixing chamber are connected to each other and are adapted to be replaced together. Optionally, a nozzle containing the mixing chamber and containers from which the flow generator extracts the chemicals are adapted to be replaced together. Optionally, the device includes at least two channels which lead the chemicals to the mixing chamber, wherein the channels have a decreasing cross-section as they approach the mixing chamber.

Optionally, the device includes at least two channels which lead the chemicals to the mixing chamber, wherein at least a portion of the channels is held in a closed state when the flow generator does not operate. Optionally, a pressure holding the channels closed is greater than a pressure holding the mixing chamber in the closed state. Optionally, the pressure holding the channels closed gradually decreases along the channels as the channels approach the mixing chamber. Optionally, the pressure holding the channels closed varies due to variations in the walls of the channels. Optionally, the pressure holding the channels closed varies due to variations in an external member that applies pressure to the walls of the channels. Optionally, walls of the mixing chamber are pressed against each other in the closed state, possibly by an external force.

There is further provided in accordance with an exemplary embodiment of the invention, a chemical mixing device, comprising a flow generator operative to provide at least two streams of chemicals and a mixing chamber, including at least two inlets adapted to receive the at least two streams of chemicals and an outlet through which a mixture of the streams of chemicals is ejected, the volume of the mixing chamber from a first mixing point of the streams to the outlet is not greater than 20 cubic millimeters.

Optionally, a length of the mixing chamber from the inlets to the outlet is not longer than 15 millimeters. Optionally, the flow generator is adapted to provide the streams at a sufficient pressure such that when the streams reach the first mixing point they have a pressure sufficient to push out of the mixing chamber foam remnants filling the entire mixing chamber.

Optionally, a cross section of the mixing chamber increases monotonically from the first mixing point to the outlet. Alternatively, a cross section of the mixing chamber is substantially constant from the first mixing point to the outlet.

Optionally, the device includes a pressure valve which prevents at least one of the chemical streams from reaching the first mixing point, unless the stream applies a pressure above 3 bar. Optionally, the mixing chamber material has a hardness of less than 60 shore A or even less than 40 shore A. Optionally, the mixing chamber is formed of a material which does not stick to polyurethane foam. Optionally, the mixing chamber has an average cross section area of less than 10 square millimeters.

There is further provided in accordance with an exemplary embodiment of the invention, a chemical mixing device, comprising a flow generator operative to provide at least two streams of chemicals and a mixing chamber, including at least two inlets adapted to receive the at least two streams of chemicals and an outlet through which a mixture of the streams of chemicals is ejected, the mixing chamber is formed of a flexible material.

Optionally, the mixing chamber is formed of a material to which polyurethane foam does not stick. Optionally, the mixing chamber material has a hardness of less than 60 shore A.

Optionally, the device includes an external pressure applicator which continuously applies a closing pressure to the mixing chamber. Optionally, the mixing chamber is formed as a single piece with at least two chemical leading channels for leading chemicals to the mixing chamber.

There is further provided in accordance with an exemplary embodiment of the invention, a chemical mixing device, comprising a flow generator operative to provide at least two streams of chemicals and a mixing chamber, including at least two inlets adapted to receive the at least two streams of chemicals and an outlet through which a mixture of the streams of chemicals is ejected; and a flow regulator which prevents flow into the mixing chamber unless the chemical streams from the flow generator have a pressure above a threshold of at least 2 bar.

Optionally, the flow regulator comprises portions of flexible channels leading chemicals to the mixing chamber which are pressed into a closed position. Optionally, the flow regulator prevents flow into the mixing chamber unless the chemical streams from the flow generator have a pressure above a threshold of at least 4 bar.

There is further provided in accordance with an exemplary embodiment of the invention, a chemical mixing device, comprising a flow generator operative to provide at least two streams of chemicals, a mixing chamber, including at least two inlets adapted to receive the at least two streams of chemicals and an outlet through which a mixture of the streams of chemicals is ejected and at least two channels having a decreasing cross section area, adapted to lead the chemical streams to the inlets of the mixing chamber.

Optionally, one or more of the at least two channels have a monotonically non-increasing cross section over adjacent the inlet of the mixing chamber. Optionally, one or more of the at least two channels have a cross-section which decreases by at least a factor of 2, from an entrance of chemicals to the channels, to the inlet of the mixing chamber. Optionally, one or more of the at least two channels has a cross-section of less than 3 square millimeters at the inlet to the mixing chamber.

There is further provided in accordance with an exemplary embodiment of the invention, a foam dispensing device, comprising a plurality of input tubes adapted to receive chemicals, a mixing chamber having at least one elastic wall and a flow generator adapted to induce flow of the chemicals received from the input tubes into the mixing chamber, the mixing chamber has a first volume when the flow generator is not operating, and a second, larger, volume when the flow generator induces flow of the chemicals into the mixing chamber.

Optionally, the plurality of input tubes receive chemicals from containers included in a casing of the dispensing device. Optionally, the plurality of input tubes receive chemicals from containers not mounted on the dispensing device. Optionally, the flow generator comprises a pump, for example a gear pump. Optionally, the at least one elastic wall closes the path from the input tubes to the mixing chamber. Optionally, the mixing chamber has a large opening to the environment.

There is further provided in accordance with an exemplary embodiment of the invention, a kit for replacement of a mixing chamber of a dispensing gun, comprising a package, a mixing chamber, within the package, and a flow generator connected to the mixing chamber, within the package. Optionally, the flow generator and mixing chamber are connected such that they require use of tools for separation. Optionally, the kit includes at least one chemical container included in the package, connected to the flow generator.

There is further provided in accordance with an exemplary embodiment of the invention, a kit for replacement of a mixing chamber of a dispensing gun, comprising a package, a nozzle defining a mixing chamber within the package, and at least one chemical container connected to the nozzle, within the package.

BRIEF DESCRIPTION OF THE DRAWINGS

Particular exemplary embodiments of the invention will be described with reference to the following description of embodiments in conjunction with the figures, wherein identical structures, elements or parts which appear in more than one figure are generally labeled with a same or similar number in all the figures in which they appear, in which.

DETAILED DESCRIPTION OF EXEMPLARY EMBODIMENTS

General

Figure 1:
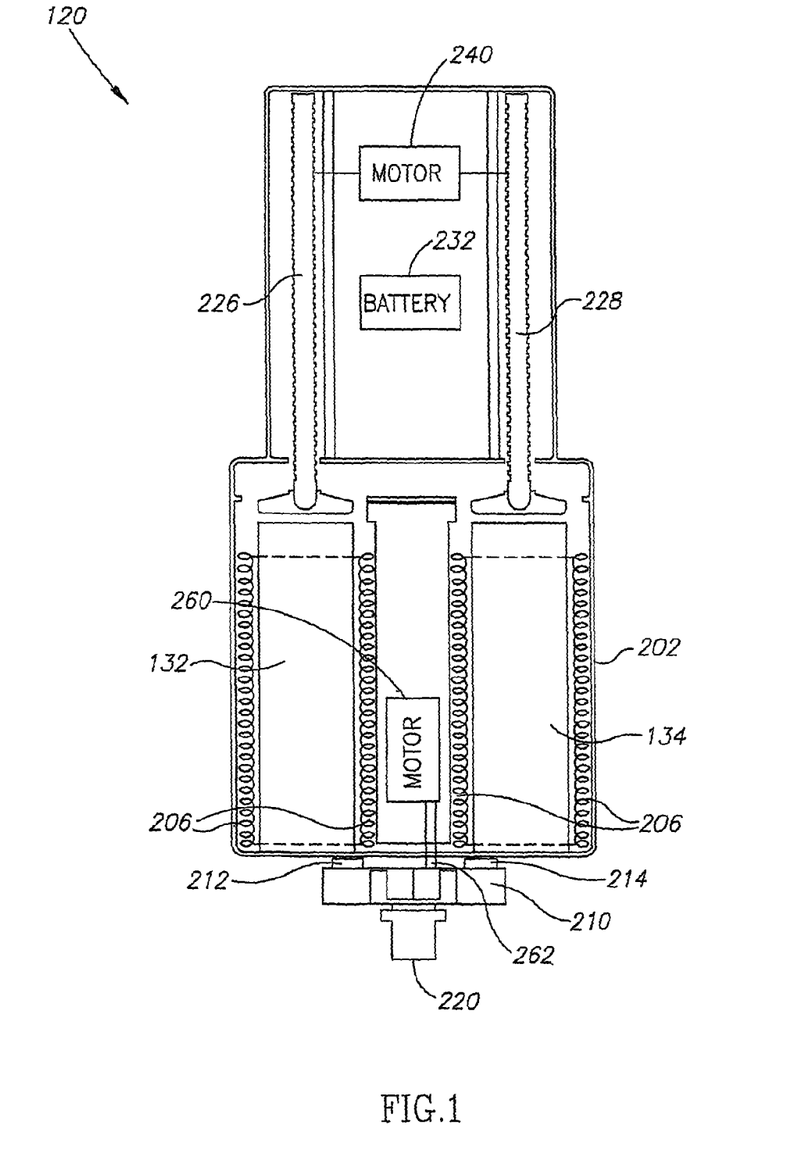
FIG. 1 is a cross-sectional view of a hand-held foam dispensing gun, in accordance with an exemplary embodiment of the invention.

FIG. 1 is a sectional view of a hand-held foam dispensing gun 120, in accordance with an exemplary embodiment of the invention. Gun 120 includes a body section 202 adapted to receive a container 132 of a first chemical A and a container 134 of a second chemical B. The mixing of chemicals A and B optionally generates a packaging foam or any other desired mixture.

In an exemplary embodiment of the invention, chemical A comprises a polymeric isocyanate or a fluorocarbon, while chemical B comprises polyols, catalyst or flame retardants. It is noted, however, that dispensing gun 120 is not limited to use with any specific chemicals and has advantages which are useful for mixing many chemicals. Particularly, the materials from which dispensing gun 120 is formed are optionally selected according to the chemicals being mixed. Alternatively or additionally, the size of containers 132 and 134 may be selected according to the specific chemicals used. For example, rather than using containers of same sizes, containers of different sizes may be used, according to the mixing ratio of the chemicals.

A pumping unit 210 (referred to hereinbelow, for brevity, as "pump 210") including one or more pumps, for example a pump for each chemical stream, generates flow of chemicals from containers 132 and 134 through channels 212 and 214, respectively. In some embodiments of the invention, pump 210 comprises one or more metering pumps which accurately control the amount of chemicals pumped.

The chemicals are passed at a high pressure into a nozzle 220 in which the chemicals are mixed. Optionally, a motor 260 rotates a shaft 262 which operates pump 210. In an exemplary embodiment of the invention, pump 210 is as described in the above mentioned U.S. provisional patent application 60/556,883 and/or in a PCT application filed in the Israel receiving office on same date as the present application, titled, "Self-Contained Foam Dispenser" and assigned to the assignee of the present application, the disclosure of which is incorporated herein by reference.

As shown, pump 210 is located between containers 132 and 134 on one side, and nozzle 220 on the other side. Optionally, no tubes (especially not tubes longer than 10 centimeters) are required to connect containers 132 and 134 and nozzle 220, to pump 210. Optionally, the chemicals come in contact with parts of pump 210. Alternatively, pump 210 includes one or more peristaltic pumps, or any other pumps which do not come in contact with the chemicals. Further alternatively or additionally, any other mechanism for pushing the chemicals into nozzle 220 is used, for example a pressure mechanism located behind containers 132 and 134, as is now described. It is noted that in the embodiment of FIG. 1, this mechanism is used in addition to pump 210, but in other embodiments it may be used instead of pump 210.

FIG. 1 also shows heating elements 206, which keep the chemicals at an optimal temperature for mixing and a battery 232 for powering gun 120. Other elements shown in FIG. 1 are pushing screws 226 and 228, and a screw motor 240, which actuates the movement of screws 226 and 228, so as to push chemicals in containers 132 and 134 toward pump 210.

It is noted, that gun 120 is described herein as an exemplary device which can use nozzle 220, and that many other chemical mixing apparatus can operate with nozzle 220 and/or with other nozzles embodying aspects of the present invention. Additional details of an embodiment of gun 120 are described in above mentioned U.S. provisional patent application 60/556,883 and/or in the above mentioned PCT application titled, "Self-Contained Foam Dispenser".

Nozzle

Figure 2A:
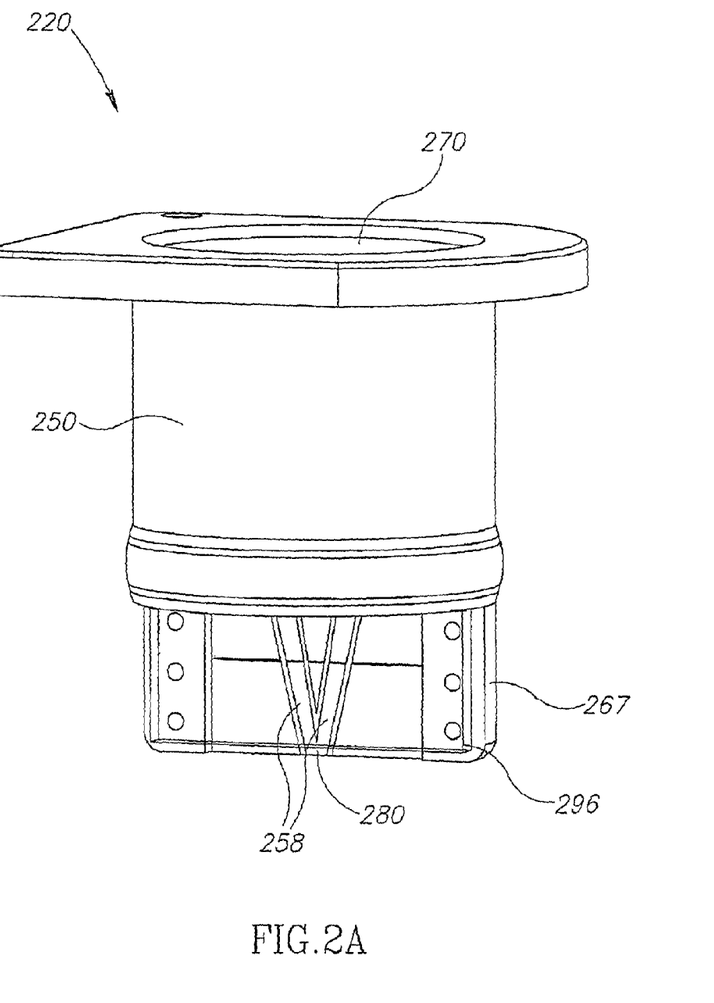
FIG. 2A is a partial cut-away schematic view of a nozzle, in accordance with an exemplary embodiment of the invention.

FIG. 2A is a schematic partially transparent view of nozzle 220, in accordance with an exemplary embodiment of the invention.

Figure 2B:
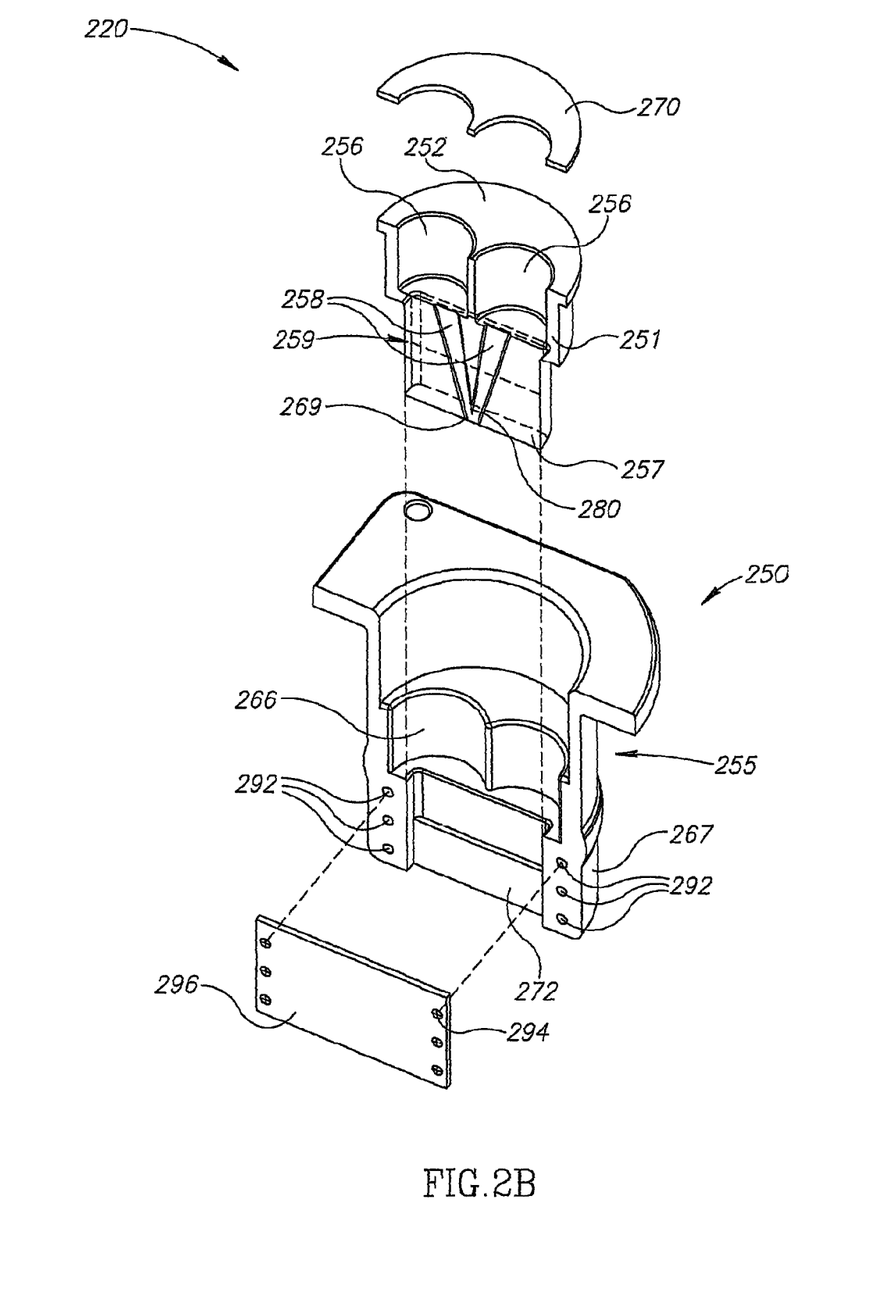
FIG. 2B is a cut-away exploded illustration of the nozzle of FIG. 2A, in accordance with an exemplary embodiment of the invention.

FIG. 2B is a cut-away exploded illustration of nozzle 220, in accordance with an exemplary embodiment of the invention. Nozzle 220 optionally includes a rigid housing 250, a compressible chemical leading unit 252, a rigid cover 270 and a pressure bar 296. Rigid cover 270 and flexible unit 252 are symmetrical and about only one half of these elements are shown in FIG. 2B. Pressure bar 296 is shown in FIG. 2B in its entirety. Rigid housing 250 is formed of an upper symmetrical portion 255, only about half of which is shown in FIG. 2B, and a lower pressure portion 267, shown in its entirety in FIG. 2B.

Chemical leading unit 252 optionally includes a wide upper area 251 including two chemical reception inlets 256, each of which receives one of the chemicals to be mixed. A channel portion 257 includes a mixing chamber 280 and two chemical leading channels 258, which separately lead the chemicals from reception inlets 256 to mixing chamber 280. Mixing chamber 280 has an outlet 269 through which mixed chemicals are ejected from gun 120. In some embodiments of the invention, channels 258 are radially located around mixing chamber 280. Optionally, the channels 258 and mixing chamber 280 have, together, a "Y" shape, the two upper arms being channels 258 and the leg of the Y being the mixing chamber. As described below, the mixing chamber may be very short, such that channels 258 and mixing chamber 280 define a "V" shape, with outlet 269 at the bottom tip of the "V", rather than a "Y" shape. The term mixing chamber is used herein to refer to volumes at least partially surrounded by walls, in which the chemicals come in contact with each other.

Optionally, channels 258 have the same cross-section area along their entire length. Alternatively, the cross-sections of channels 258 vary along the lengths of the channels. In some embodiments of the invention, channels 258 have a narrowing cross-section (for example in the form of cone funnels, as shown) toward the mixing chamber. Optionally, the cross-section of channels 258 monotonically narrows from inlets 256 to mixing chamber 280, in order to increase the velocity at which the chemicals enter mixing chamber 280.

Channels 258 optionally meet at an angle of between about 30°-60° relative to each other, in order to increase the mix quality and/or efficiency of the chemicals. Alternatively, channels 258 meet at a larger angle, such as above 100°, for example, between about 130°-170°. The chemical streams are optionally diverted from the direction in which they entered the mixing chamber, by the walls of the chamber, so as to increase the mix efficiency.

In some embodiments of the invention, mixing chamber 280 has a rectangular cross-section. Alternatively, mixing chamber 280 may have any other cross-section shape such as circular, elliptic or triangular. Optionally, mixing chamber 280 does not include corners and/or enclaves in which foam remnants can settle. Optionally, mixing chamber 280 has substantially the same cross-section area along its entire length. Alternatively, mixing chamber 280 has a decreasing cross-section area toward its outlet to the atmosphere, in order to increase the mixing effect. Further alternatively, the mixing chamber has a cross-section which increases toward its outlet, in order to allow easier cleaning of the mixing chamber.

Upper portion 255 of rigid housing 250 optionally has inner contours adapted to receive wide upper area 251 of chemical leading unit 252. Upper portion 255 defines receptacles 266 shaped to receive inlets 256. In some embodiments of the invention, a rigid cover 270 is fit within housing 250, above compressible unit 252.

Lower pressure portion 267 and pressure bar 296 are shaped to receive channel portion 257 of compressible unit 252 and apply pressure to channel portion 257, so as to bias channels 258 and/or mixing chamber 280 in a closed state. During operation, the pressure of the chemical streams provided by pump 210 opens the channels and/or mixing chamber, as described in detail below.

Pressure on Mixing Chamber

In some embodiments of the invention, pressure bar 296 carries screws 294 which mate with respective screw holes 292 in lower pressure portion 267. Screws 294 are optionally used to adjust the pressure applied on channel portion 257 of compressible unit 252. Alternatively, any other attachment method is used to connect pressure bar 296 to lower pressure portion 267 and/or to adjust the pressure applied to channel portion 257. Further alternatively, the pressure applied to channel portion 257 is predetermined and is not adjustable by a user.

In some embodiments of the invention, pressure bar 296 and lower pressure portion 267 apply pressure to channel portion 257 over its entire length. Alternatively, pressure is applied only to part of channel portion 257, for example by a bulging portion 272 which covers only a part of the height of pressure portion 267.

Optionally, the pressure is applied over the entire area of chamber 280, such that in the closed state the mixing chamber has a substantially zero volume. In some embodiments of the invention, the pressure closes a substantial percentage of the length of channels 258, for example at least 10%, 20% or even 30% of the length of the channels.

In some embodiments of the invention, for simplicity, bulging portion 272 extends to a same thickness extent over its entire height (corresponding to the length of channels 258), so as to apply a same pressure along the entire portion of compressible unit 252 to which the pressure is applied. In some of these embodiments, channel portion 257 has the same thickness over its entire length.

Alternatively, bulging portion 272 applies different pressure levels along its height. In some embodiments of the invention, bulging portion 272 extends to different thickness extents along its width. Alternatively or additionally, the rigidity of compressible unit 252 and/or the thickness of channel portion 257 varies along its length, such that a bulge of a same extent applies different pressure to different portions of compressible unit 252. Further alternatively or additionally, the cross-section of channels 258 and/or mixing chamber 280 varies along the length of channel portion 257, in order to vary the pressure applied by housing 250 and bar 296.

In some embodiments of the invention, a highest pressure is applied along channels 258 at a blockage line 259, which is located, for example, at a point between about 60%-80% of the distance from reception inlets 256 to mixing chamber 280. Optionally, less pressure is applied from blockage line 259 to a lower end of compressible unit 252, including mixing chamber 280. It is noted, however, that even the low pressure level closes the mixing chamber 280 entirely, such that no foam remnants can harden within the mixing chamber or in channels 258. In some embodiments of the invention, bulging portion 272 has a triangular profile with a peak at blockage line 259. In other embodiments of the invention, bulging portion 272 has a step profile. Applying a higher pressure to blockage line 259 than to mixing chamber 280, ensures that mixed chemicals do not backup through channels 258 to pump 210. Rather, chemicals remaining within the mixing chamber when the operation of dispensing gun 120 is stopped, are ejected through the outlet 269 due to the lower closing pressure relative to the pressure applied to channels 258.

In an exemplary embodiment of the invention, in which channels 258 and mixing chamber 280 form a Y shape, pressure is applied to the compressible unit 252 to squeeze both the upper appendages and the lower leg of the "Y" to zero volume. Optionally, the pressure applied to the "Y" zone is not even along the vertical axis of the Y. Optionally, the applied pressure is higher at the top of the arms and gradually decreases down to the output point of the nozzle (the bottom line of the leg of the Y). The highest applied pressure at the top of the Y arms causes the hydraulic pressure within compressible unit 252 to go downward. When the operation of pump 210 is stopped, the top of the arms of the "Y" will be the first to respond and squeeze the tunnel to block passage of chemicals in both directions. In the next few milliseconds the pressure on the "Y" zone will squeeze and press out any residual chemicals that remain in channels 258 and in mixing chamber 280. Thereafter, in the following several seconds, any remaining chemicals in mixing chamber 280, will be ejected through outlet 269, since channels 258 (the Y arms) are blocked by high pressure and the mixing chamber (the Y leg) is squashed by a relatively lower pressure.

In an exemplary embodiment of the invention, the chemical streams are provided by pump 210 at a pressure between 6-10 atmospheres (e.g., 6.079-10.13 bar). Housing 250 optionally applies a pressure of between about 2-10 Kg on blockage line 259, such that the chemical streams entering mixing chamber 280 have a pressure level of at least 4 atmospheres or even more than 6 or 9 atmospheres. In an exemplary embodiment of the invention, the streams have a pressure of about 6-7 atmospheres. It is noted that pump 210 may achieve the pressure by suction, by pressure or by any combination thereof.

The pressure of the streams supplied by pump 210 may be adjusted according to a compromise between cost and mix quality. The pressure of the streams may also depend on the power consumption and the weight of the dispensing gun. Other factors which may be determined based on a compromise between cost and mix quality, include, for example, the temperature of the mixed chemicals, the angle of entrance of the chemicals into the mixing chamber and the flexibility of the mixing chamber.

Channels 258 are optionally sufficiently long to prevent any amount of mixed chemicals passing beyond blockage line 259 from reaching pump 210.

Compressible Unit

In some embodiments of the invention, compressible unit 252 is formed as a single piece, from a same material along its entire length. Alternatively, different parts of compressible unit 252 are formed of different materials. Possibly, different parts of compressible unit 252 have different compression characteristics. In an exemplary embodiment of the invention, the walls of mixing chamber 280 are more compressible than the remaining portions of compressible unit 252. Further alternatively or additionally, the proximal portion of mixing chamber 280 is more compressible than the distal portion of mixing chamber 280, adjacent outlet 269.

In some embodiments of the invention, the material of mixing chamber 280 has a hardness of less than 60 shore A, less than 45 shore A or even less than 30 shore A.

Alternatively or additionally to forming compressible unit 252 as a single piece, compressible unit 252 is formed of a plurality of separate pieces which are connected together, for example by housing 250.

In some embodiments of the invention, nozzle 220 is formed as an integral part of gun 120, as foam remnants do not clog mixing chamber 280, and there is no need to replace nozzle 220 after every use. Alternatively, nozzle 220 is a removable attachment of gun 120 so as to allow replacement. Nozzle 220 is optionally connected in a fast release manner, allowing simple and fast replacement of nozzle 220, when required.

In some embodiments of the invention, it is recommended to replace nozzle 220 after a predetermined number (e.g., 10, 40, 100) of uses of the dispensing gun, as the contact with the mixed chemicals slowly wears the nozzle. Optionally, nozzle 220 is replaced as a single unit. Alternatively, only compressible unit 252 is replaced. In some embodiments of the invention, nozzle 220 is manufactured and/or sold as a single unit with pump 210 and/or with any other pump. Although pump 210 is expected to last much longer than nozzle 220, for example twice or even five or ten times the number of uses, the replacement of the nozzle along with pressure pump 210 makes the handling of dispensing gun 120 much simpler, requiring only a single type of replacement. Optionally, pump 210 is manufactured from cheap materials, such that its replacement along with nozzle 210 is relatively inexpensive.

Operation

Optionally, as long as pump 210 is not operative, the pressure from lower portion 267 and bar 296 keeps channels 258 blocked and/or mixing chamber 280 with a substantially zero volume (e.g., less than 1 cubic millimeter, or even less than 1 cubic micron). In operation, pump 210 sucks the chemicals out of containers 132 and 134 (FIG. 1) and ejects the chemicals into inlets 256, at a high pressure, greater than the closing pressure applied by housing 250 onto channel portion 257. When pump 210 is operated, the force of the chemical streams passing through channels 258 causes the compressible material of compressible unit 252 to contract and allow passage through the channels and/or enlarge mixing chamber 280. Within chamber 280 the chemicals mix and turn into a foam generating mixture, which is ejected from outlet 269 of mixing chamber 280. Within about 10-20 seconds from the mixing of the chemicals, the chemicals expand into a foam. Optionally, pump 210 provides the chemical streams with a pressure of at least 5 atmospheres or even at least 7 atmospheres, so as to sufficiently open channels 258 and/or in order to achieve a good quality mix of the chemicals.

When the operation of pump 210 is stopped, the pressure from pressure bar 296 and housing 250 moves mixing chamber 280 to its closed state and squeezes any remaining mixed chemicals out of the mixing chamber, through outlet 269. The mixed chemicals do not retract back into channels 258 due to the pressure on the channels, which is optionally higher and/or applied earlier than the closing pressure on mixing chamber 280. The next time pump 210 is operated, any foam remnants that remain at outlet 269 and/or within mixing chamber 280 are pushed out of the way by the chemical streams.

Mixing Chamber

In some embodiments of the invention, mixing chamber 280 is small, such that the maximal amount of foam remnants within mixing chamber 280 can be pushed out by the pressure of the chemical streams entering mixing chamber 280. Optionally, mixing chamber 280, from blockage line 259 to outlet 269, has a length of less than 10 millimeters, less than 5 millimeters or even not more than 3 millimeters. Mixing chamber 280 optionally does not include any obstacles (such as a baffle) along its length from a first mixing point at which the chemical streams first meet and outlet 269.

Mixing chamber 280 optionally has in its open position a volume of at least 3 cubic millimeters or even at least 5 cubic millimeters, so as to provide sufficient room for mixing of the chemicals. Optionally, in the open position, mixing chamber 280 has a volume of less than 20 cubic millimeters or even less than 10 or even 3 cubic millimeters. In an exemplary embodiment of the invention, mixing chamber 280 has an area of less than 1 cubic millimeter.

Using such a small mixing chamber allows easy closing of the mixing chamber. Alternatively or additionally, in order to allow for a better chemical mix, mixing chamber 280 has a volume, in its open position, larger than 50 cubic millimeters, larger than 1 cubic centimeter or even larger than 2 cubic centimeters. A large mixing chamber allows in some cases for better mixing, faster production of foam and easier access for cleaning to the mixing chamber.

Materials

In some embodiments of the invention, chemical leading unit 252 is formed of a smooth material to which foam does not stick, or at least has a relatively weak bonding, so as to allow easier removal of foam remnants from mixing chamber 280. Alternatively or additionally, compressible unit 252 is formed of a resilient material, whose resilience lasts over relatively long periods. Exemplary materials of mixing chamber 280, in accordance with embodiments of the present invention, include one or more of Teflon, polyethylene, silicon (e.g., silicon rubber) and/or combinations thereof. In an exemplary embodiment of the invention, compressible unit 252 comprises 40-Shore silicon.

Housing 250 is optionally formed of a rigid material, such as a rigid plastic or a rigid metal (e.g., aluminum). In an exemplary embodiment of the invention, housing 250 comprises a polypropylene reinforced by, for example 50%, glass fibers.

Alternative Embodiments

Alternatively to nozzle 220 including a housing 250 which encompasses most of the surface area of compressible unit 252, a stand alone ring or pair of bars is used to apply pressure to channel portion 257. The ring is placed at the height of mixing chamber 280 and/or line 259. The ring is optionally formed of a metal, plastic or any other rigid material. Optionally, nozzle 220 is provided with the ring permanently mounted thereon. Alternatively, the ring is formed of two ports connected by a hinge and a snapping portion, which closes in a manner which provides the required pressure. Further alternatively or additionally, a ring is embedded within the walls of compressible unit 252. Alternatively to a rigid ring, an elastic ring may be used.

Further alternatively, the pressure is applied by one or more spring loaded bars that take the place of pressure bar 296 and that press against channel portion 257. In other embodiments of the invention, compressible unit 252 is formed of a material and/or configuration inherently biased in the closed position of mixing chamber 280. Optionally, a material with a strong internal bias into the closed position is used. In some embodiments of the invention, an elastic material which even in the closed position attempts to contract, is used for compressible unit 252 in accordance with this embodiment. When dispensing gun 120 is operated, the chemical streams move mixing chamber 280 into the open position. When the chemical streams are terminated, the inherent bias of compressible unit 252 closes mixing chamber 280 and/or channels 258.

In the above embodiments, mixing chamber 280 is preset in a closed position and the chemical streams move the mixing chamber into the open position. When the chemical streams are stopped, the mixing chamber returns to its closed position. In other embodiments of the invention, the state of mixing chamber 280 is controlled at least partially by pressure applied by means other than the chemical streams.

In some embodiments of the invention, a control of dispensing gun 120, which controls the operation of pump 210, also controls a pressing device, which moves mixing chamber 280 into its closed state. Optionally, slightly before (or simultaneously with) stopping the operation of pump 210, valves on channels 258 are closed, in order to prevent backflow of the chemicals when the operation of pump 210 is stopped. Alternatively or additionally, shortly after the operation of pump 210 is stopped (i.e., before remnants of mixed chemicals harden), external pressure is applied to mixing chamber 280, to squeeze out any remnants of mixed chemicals. The external pressure on mixing chamber 280 is optionally applied after channels 258 are closed, such that any material pushed out of the mixing chamber goes out through outlet 269 and does not backflow up channels 258.

The external pressure is optionally applied for a short period (e.g., up to several seconds or minutes) and then removed until after the next time dispensing gun 120 is used. In some of these embodiments, valves are used to prevent flow of chemical drops remaining in channels 258 after the mixing chamber is reopened. Alternatively, the external pressure is applied continuously, until the next time dispensing gun 120 is operated. In some embodiments of the invention, a relatively high pressure is applied for a short period and is then reduced to a minimal pressure required to keep the mixing chamber in the closed position, until the next time dispensing gun 120 is used.

Figure 3:
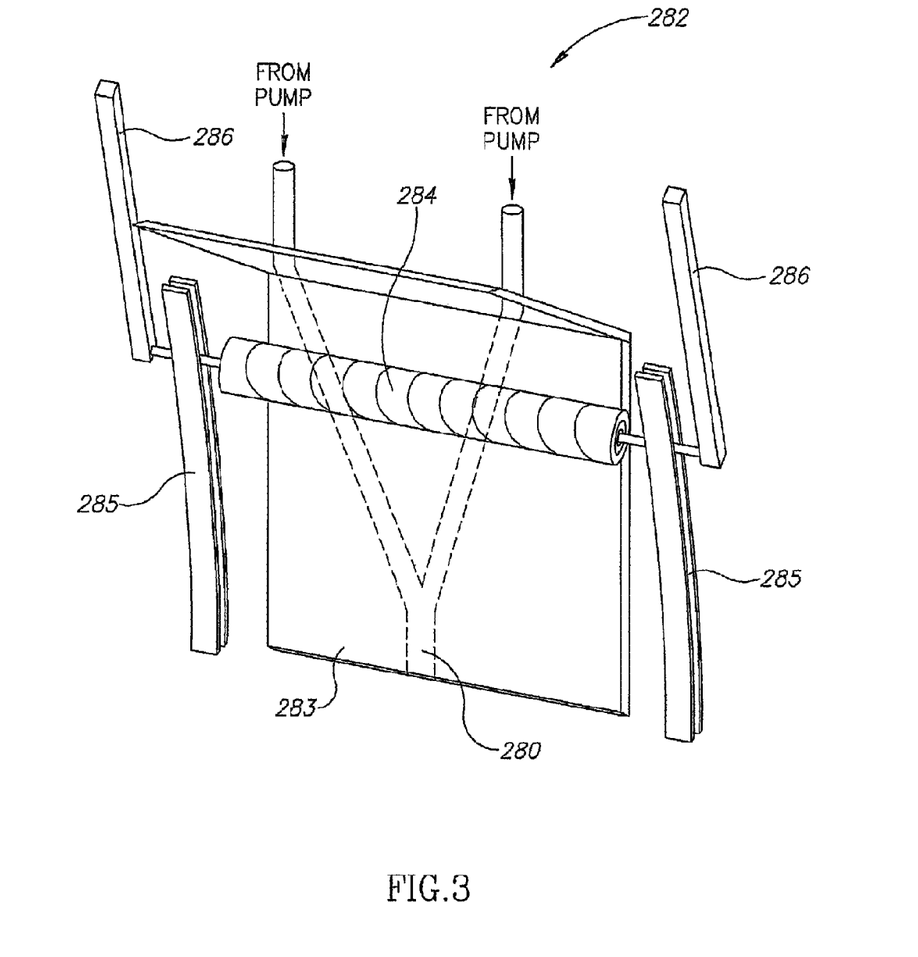
FIG. 3 is a schematic illustration of a dynamic nozzle, in accordance with an exemplary embodiment of the invention.

FIG. 3 is a schematic illustration of a dynamic nozzle 282, in accordance with an exemplary embodiment of the invention. Nozzle 282 includes a compressible unit 283, similar to compressible unit 252. Instead of a rigid housing or ring which presses the mixing chamber 280 and/or channels 258 closed, nozzle 282 includes a roller 284, which applies a closing pressure against mixing chamber 280, at the end of each foam generation session. The movement of roller 284 is optionally controlled by the dispensing gun through arms 286, which lead the roller within rails 285. Roller 284 optionally moves toward the distal end of mixing chamber 280, such that chemicals squeezed out of channels 258 and/or mixing chamber 280 do not backflow into a pump of the dispensing gun. The roller optionally passes over the mixing chamber from the area closest to the entrance of the chemicals, toward outlet 269 of mixing chamber 280, so that the remnants are ejected from the mixing chamber.

Alternatively to using a compressible material for nozzle 282, a non-compressible flexible material may be used. Nozzle 282 may be formed of an elastic material, which returns to its open configuration when roller 284 is removed or may be formed of a non-elastic material, such that the mixing chamber reopens only when chemical streams are introduced to the chamber.

Figure 4A:
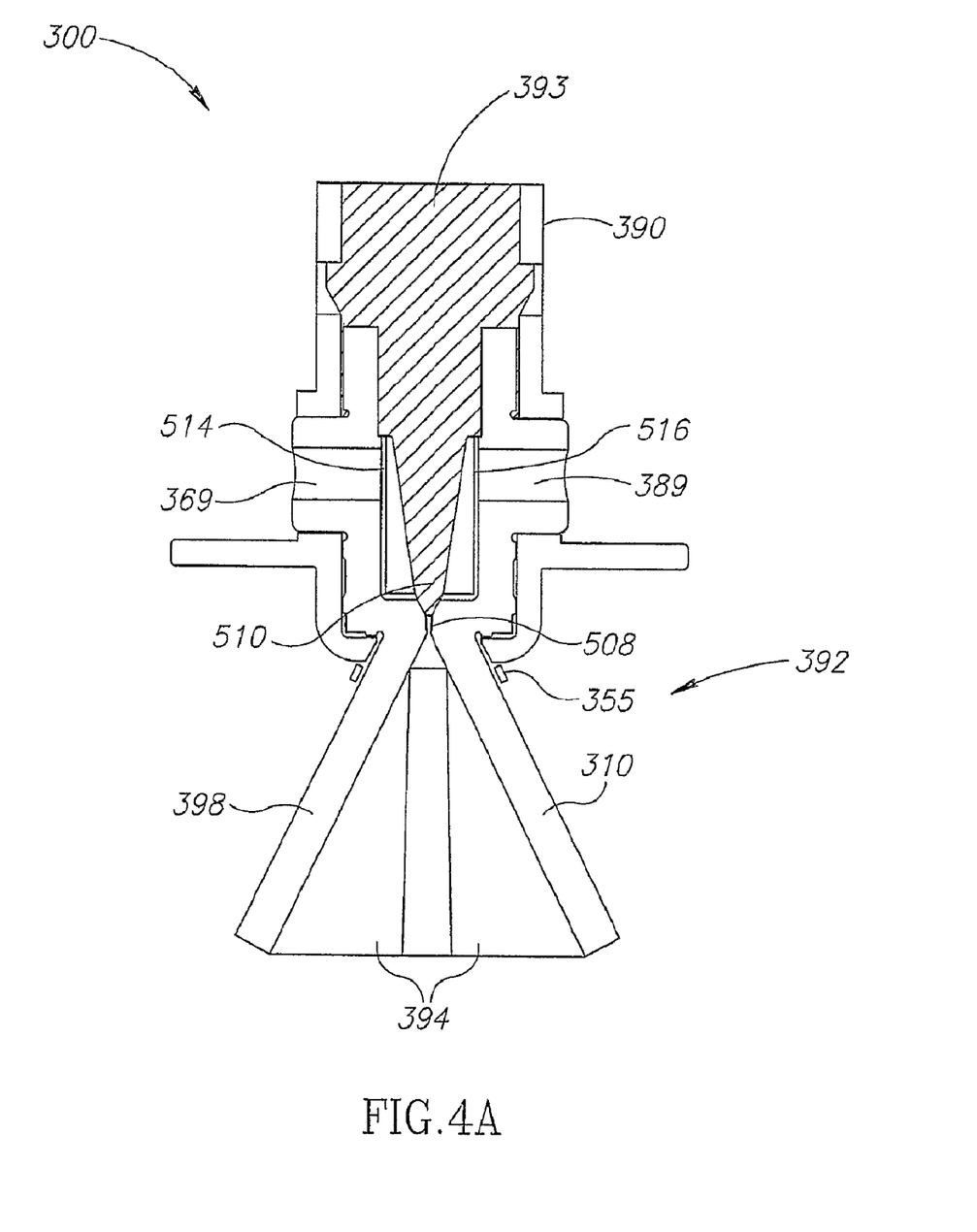
FIGS. 4A and 4B are cross-sectional views of a chemical mixing nozzle, with a closed and open mixing chamber state respectively, in accordance with an exemplary embodiment of the invention.
Figure 4B:
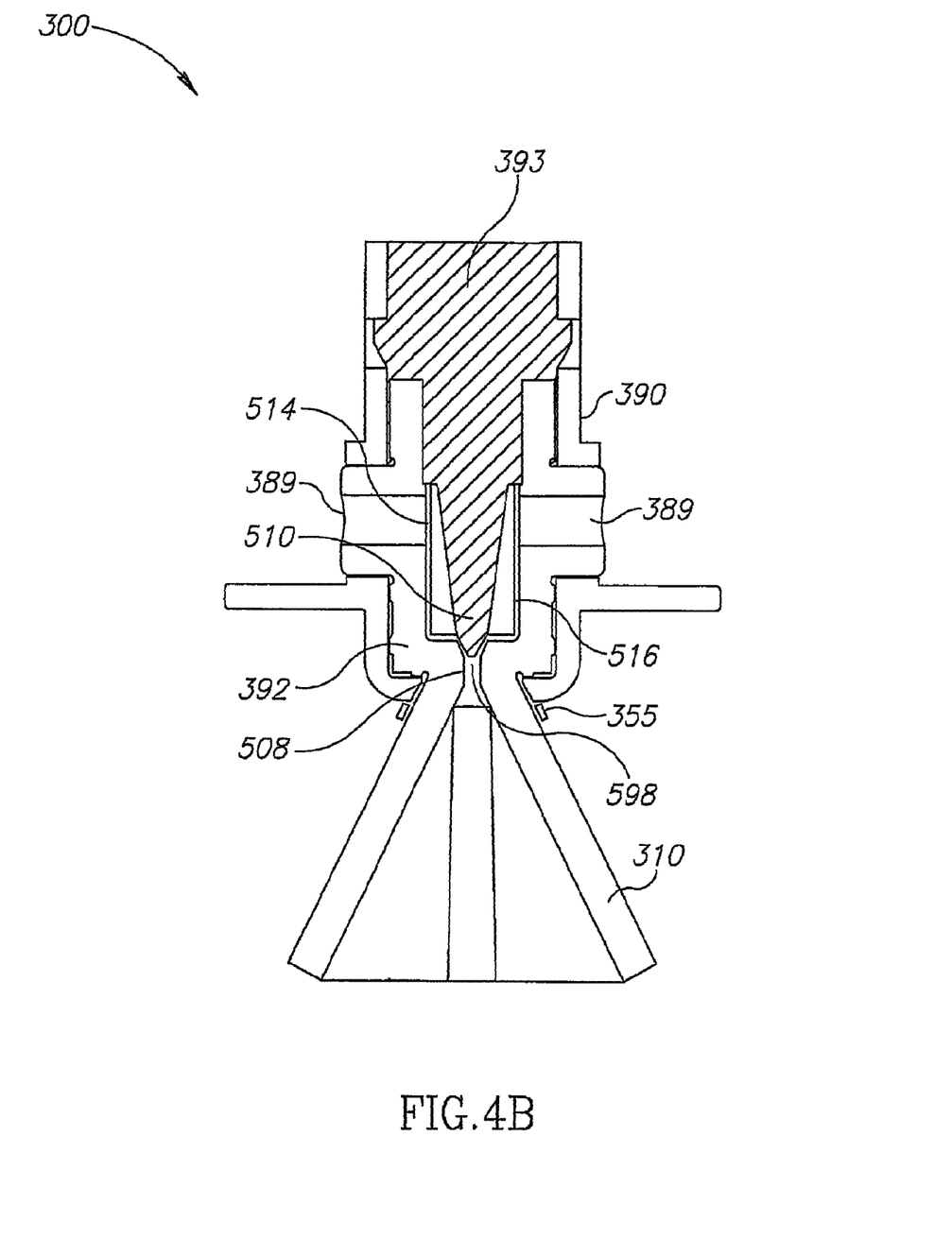

FIG. 4A is a cross-sectional view of a chemical mixing nozzle 300, in accordance with an exemplary embodiment of the invention. Nozzle 300 is formed of a circular unit 390, an internal piece 393 and an exit unit 392. During operation of pump 210 (FIG. 1), the chemicals enter through a bore 389 and a bore 369. A chemical stream from bore 389 enters a narrow channel 516 passing within exit unit 392. Similarly, the chemical from bore 369 flows into a narrow channel 514, within exit unit 392. The chemical streams exit narrow channels 514 and 516 near a tip 510 of internal piece 393, and press against a valve defined by opposite lips 508 of exit unit 392. The pressure on lips 508, due to high pressure from pump 210, causes lips 508 to separate, as shown in FIG. 4B, which is a variation of FIG. 4A in which the pressure of the chemicals form at least a portion of a mixing chamber 598. Nozzle 300 optionally comprises compressible materials that allow separation of lips 508 under pressure. The chemicals from narrow channels 514 and 516 enter mixing chamber 598 and mix together. From mixing chamber 598, the mixed chemicals flow out a flared outlet 310 of nozzle 300 into their desired packing location according to the direction of gun 120. When pump 210 stops its operation, the pressure on lips 508 stops and they return back into their closed position (FIG. 4A), preventing settling of foam within mixing chamber 598.

Lips 508 serve as compressible walls which define mixing chamber 598, when the walls are expanded by the pressure of the chemicals exiting narrow channels 514 and 516. A potential advantage of using a compressible wall is that it reduces the amount of mixed chemicals that can settle within chamber 598 and hence the amount of foam remnants hardening in chamber 598 is very small or even negligible. In addition, compressible walls can completely close mixing chamber 598.

In some embodiments of the invention, when the chemicals are not pumped out of the containers, the volume of mixing chamber 598 is substantially zero, due to the return of lips 508 back into their rest position (FIG. 4A). Alternatively, the closing of lips 508 closes a portion of chamber 598 nearer channels 514 and 516. The remaining portion of chamber 598 is open to the environment. Optionally, any settling of foam in nozzle 220 can be easily removed by pressing the walls of flared outlet 310 by a human operator.

As shown in FIGS. 4A and 4B, the streams in narrow channels 514 and 516 are not directed at lips 508 but rather at tip 510. Therefore, a relatively high chemical pressure is required in order to open a passageway to mixing chamber 598. In other embodiments of the invention, narrow channels 514 and 516 are more directly pointed at lips 508, thus reducing the pressure level required in order to open the lips.

Optionally, a rigid ring 355 is connected around lips 508, in order to increase the resistance of lips 508 to opening and hence the speed and/or strength of the closing of mixing chamber 598 when pump 210 is not operative. Alternatively to a rigid ring, an elastic ring is used. In accordance with this alternative, exit unit 392 does not necessarily comprise a compressible material and any other flexible material may be used.

In some embodiments of the invention, the high pressure of the chemical streams has a double purpose. On the one hand, the pressure opens mixing chamber 598 and the path out of pump 210 to flared outlet 310. On the other hand, the pressure is used in achieving a high quality mix of the chemicals.

Flared outlet 310 is optionally formed of a flexible but durable material, such that the walls of flared outlet 310 can be pressed together in order to remove foam remnants that settled in the nozzle, if such remnants remain. The pressing generally grinds the foam remnants or at least causes them to detach from the nozzle. In some embodiments of the invention, flared outlet 310 has two parallel relatively rigid walls 398, connected by two more flexible walls 394. When pressed on, the flexible walls 394 move and collapse, while the rigid walls compress the foam remnants. In some embodiments of the invention, flexible walls 394 have a central folding line. Alternatively or additionally, flared outlet 310 is formed of a material to which foam remnants do not stick or at least have a relatively weak bonding. In an exemplary embodiment of the invention, flared outlet 310 is formed of Teflon and/or polypropylene. In other embodiments, polyethylene and/or silicon are used.

Flared outlet 310 is optionally flared in order to minimize the settling of the mixed chemicals on walls of the nozzle. In some embodiments of the invention, flared outlet 310 has a rectangular cross section. Alternatively, flared outlet 310 has a circular and/or conical shape. Flared outlet 310 has an expanding shape toward its outlet to the environment, so that it is relatively easy to remove foam remnants from the nozzle (e.g., by allowing simple access with a screwdriver or other tool) and hardening foam remnants are not caught tightly between the walls of the nozzle. Optionally, flared outlet 310 does not include corners and/or enclaves in which foam remnants can settle. Flared outlet 310 optionally has a length and/or width sufficiently large to receive the fingers of a user and allow the user to press against the walls in order to remove foam remnants therefrom.

Flared outlet 310 helps makes it easy to remove any foam that hardens in the nozzle, either mechanically (for example by pressing the sides of flared outlet 310 or by scraping out the material) or by pressure from the foam formed during the next use. In addition, lips 508 serve as a valve which prevents dripping of material when pump 210 stops operating. In some embodiments of the invention, exit unit 392 may be used for a plurality of foam dispensing sessions, which occur at different times separated by hours, days or even weeks.

In some embodiments of the invention, exit unit 392 is planned to allow its fast connection and/or release from circular unit 390. Alternatively or additionally, exit unit 392 and circular unit 390 are designed to allow their fast connection and/or release from and to the remaining portion of pump 210. Circular unit 390 and/or exit unit 392 are optionally easily replaced, when necessary, for example due to clogging by settlement of foam remnants.

It is noted that, in some embodiments of the invention, the chemicals from containers 132 and 134 are mixed only in exit unit 392, such that foam remnants can settle only within these easily replaced pieces. As lips 508 serve as valves which only allow passage of the chemicals when the chemicals are provided in relatively high pressure streams, the mixed chemicals cannot backflow into pump 210. Typically, after each 5-10 uses and/or when the operation is problematic (e.g., the mix is not good, the stream is weak), exit unit 392 is replaced. In some embodiments of the invention, the mixed chemicals also touch the tip 510 of internal piece 393. Optionally, in these embodiments, internal piece 393 is also easily replaceable, for example every 10-20 uses, or even every 100 uses. Alternatively, chamber 598 is defined closer to flared outlet 310, so that the mixed chemicals only touch portions of exit unit 392, which is easily replaceable.

Alternatively to lips 508 only blocking the chemical channels, lips 508 are pressed together onto or next to internal piece 393, such that mixing chamber 598 has zero volume in the closed state.

Nozzle 220 is described above with relation to a hand held dispenser gun. It is noted, however, that nozzle 220 and/or other nozzles (e.g., nozzle 300) implementing aspects of the present invention may be used with other types of dispensing guns, such as table mounted dispensing machines, and dispensing guns which receive the chemicals through tubes (e.g., heated tubes) from remote containers. In an exemplary embodiment of the invention, nozzle 220 is used with a dispensing machine that has automatic bag feeding or with any of the other embodiments in the above mentioned PCT application titled "Self-Contained Foam Dispenser".

The present invention may be used with substantially any chemicals which need to be held separately before they are mixed. While gun 120 is shown as mixing two chemicals, the principals of the gun may be used for mixing three or more chemicals.

It will be appreciated that the above described methods may be varied in many ways. It should also be appreciated that the above described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A foam dispensing device, comprising:
two input tubes, each input tube receiving a different chemical;
a mixing chamber having at least one elastic wall; and
a flow generator adapted to induce flow of the chemicals received from the input tubes into the mixing chamber,
wherein the mixing chamber has a first substantially zero volume corresponding to a closed state, and a second larger volume corresponding to an open state in which the flow of chemicals is mixed when the flow generator induces the flow of chemicals into the mixing chamber, and wherein the mixing chamber remains in the closed state in absence of the flow of chemicals.

2. The foam dispensing device of claim 1 wherein the mixing chamber includes two inlets, each inlet receiving a different one of the flow of chemicals and an outlet through which a mixture of the flow of chemicals is ejected from the foam dispensing device.

3. The foam dispensing device of claim 2, wherein the at least one elastic wall of the mixing chamber is biased in the closed state.

4. The foam dispensing device of claim 3, wherein the at least one elastic wall of the mixing chamber is biased in the closed state by a pressure greater than required to keep the mixing chamber in the closed state.

5. The foam dispensing device of claim 2, wherein the mixing chamber has a volume smaller than a cubic millimeter in the closed state.

6. The foam dispensing device of claim 2, wherein the mixing chamber has a volume of less than 20 cubic millimeters in the open state.

7. The foam dispensing device of claim 2, wherein the mixing chamber is made of a flexible material.

8. The foam dispensing device of claim 7, wherein the mixing chamber is made of a compressible material.

9. The foam dispensing device of claim 7, wherein the mixing chamber material has a hardness of less than 60 shore A.

10. The foam dispensing device of claim 7, further comprising a pressure unit which controllably applies a closing pressure on the mixing chamber when the mixing chamber is in the closed state, but does not apply the closing pressure when the mixing chamber is in the open state.

11. The foam dispensing device of claim 2, wherein the flow generator and the mixing chamber are connected to each other and are adapted to be replaced together.

12. The foam dispensing device of claim 2, wherein the mixing chamber is part of a nozzle of the foam dispensing device, and the nozzle outputs the mixed flow of chemicals.

13. The foam dispensing device of claim 12, wherein the nozzle further comprises at least two channels leading the flow of chemicals to the mixing chamber, wherein the at least two channels have a cross-section decreasing in direction of the mixing chamber.

14. The foam dispensing device of claim 13, wherein one or more of the at least two channels have a cross-section which decreases by at least a factor of 2, from the flow generator to the mixing chamber.

15. The foam dispensing device of claim 13, wherein one of the at least two channels has a cross-section of less than 3 square millimeters in the proximity of the mixing chamber.

16. The foam dispensing device of claim 13, wherein at least a portion of the at least two channels is held in a closed state when the flow generator does not operate.

17. The foam dispensing device of claim 1, wherein the mixing chamber is not longer than 15 millimeters.

18. The foam dispensing device of claim 12, wherein the flow generator provides the flow of chemicals at a sufficient pressure to force the mixing chamber into the open state.

19. The foam dispensing device of claim 18, further comprising a pressure valve between the flow generator and the nozzle to prevent the flow of chemicals from reaching the nozzle until the flow of chemicals reaches a pressure above 3 bar.

20. The foam dispensing device of claim 1, wherein the mixing chamber is made of a material which does not stick to polyurethane foam.

21. The foam dispensing device of claim 1, wherein the mixing chamber has an average cross section area of less than 10 square millimeters.

22. The foam dispensing device of claim 1, wherein the mixing chamber is configured to push out any remnant chemicals therein when the flow of chemicals is stopped.

23. The foam dispensing device of claim 1, wherein the flow generator comprises a pump.

24. The foam dispensing device of claim 23, wherein the pump comprises a gear pump.

25. The foam dispensing device of claim 1, further comprising
an elastic ring which continuously applies a closing force to the mixing chamber.

* * * * *